April 29, 1969 A. NAZARETH, JR Re. 26,573
INDUSTRIAL PROCESS CONTROL APPARATUS
Original Filed Sept. 14, 1961
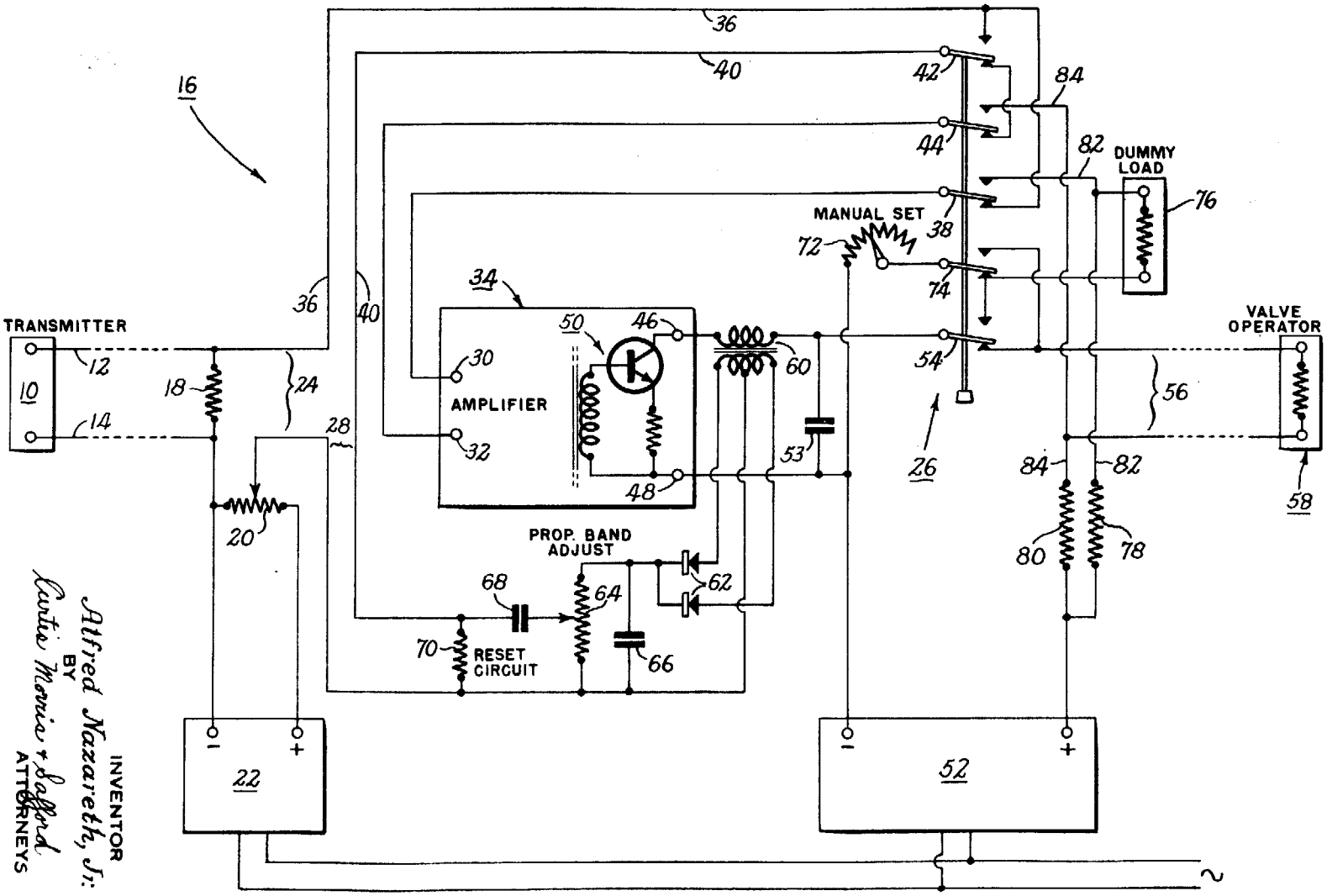
INVENTOR
Alfred Nazareth, Jr.
BY
Curtis Morris & Safford
ATTORNEYS United States Patent Office Re. 26,573
Reissued Apr. 29, 1969

26,573

INDUSTRIAL PROCESS CONTROL APPARATUS

Alfred Nazareth, Jr., Rehoboth, Mass., assignor to The Foxboro Company, Foxboro, Mass.

Original No. 3,246,250, dated Apr. 12, 1966, Ser. No. 412,877, Nov. 13, 1964, which is a continuation of application Ser. No. 138,034, Sept. 14, 1961. Application for reissue Jan. 15, 1968, Ser. No. 702,146
Int. Cl. H03f *3/38*
U.S. Cl. 330—10 14 Claims

Matter enclosed in heavy brackets [ ] appears in the original patent but forms no part of this reissue specification; matter printed in italics indicates the additions made by reissue.

*ABSTRACT OF THE DISCLOSURE*

*An electronic controller for use with an industrial process for maintaining constant a condition of the process, such as temperature, flow rate, etc., and comprising an amplifier to which is directed a deviation signal representing the difference between a condition measurement signal and a set point signal; the output of the controller normally being transmitted to a process valve operator or the like for automatically adjusting a process variable which influences the measured process condition, there being included with the controller an automatic-to-manual switch arrangement for directing to the process valve operator a manually adjustable signal in place of the automatic control signal and for storing during manual operation a signal level representing the difference between the deviation signal and the output of the controller, the controller output being caused to track the manually adjustable signal by feeding to the amplifier input a potential derived from the manually adjustable signal together with a feedback signal derived from the amplifier output so as to hold the amplifier input at null and thereby cause the amplifier output to follow the manually adjustable signal.*

This is a continuation of application Ser. No. 138,034, filed Sept. 14, 1961. This invention relates to control apparatus for maintaining constant a condition of an industrial process, for example a process condition such as temperature or rate of liquid flow, etc. More in particular, this invention relates to improvements in electronic controllers of the type adapted to transmit an electrical signal to a remote operating device which positions a process valve or the like. For background information on certain aspects of such controllers, reference may be made to U.S. Patent 2,956,234, issued to Everett O. Olsen on Oct. 11, 1960.

During the operation of industrial processes, it sometimes is desirable to control the process manually rather than automatically by means of a process controller. Thus, controllers typically are provided with means for switching from "automatic" to "manual" operation, and in the latter condition a manually-adjustable constant-magnitude signal is developed to position the process valve. In such systems, a problem is encountered in switching the controller back to automatic condition in that, if the automatic control signal is different from the manual control signal at the time of switchback, there will be a sudden change in the valve position which can produce an undesirable "upset" of the process, i.e., excessive fluctuations of the controlled process variable.

One method used heretofore to avoid this difficulty was to have the operator bring the measured process condition exactly to set point by adjusting the manual signal just prior to swtichback. Alternatively, the operator could adjust the set point to exactly equal the actual value of the measured condition. However, such "balancing" operations require time and effort, and any error by the operating personnel could have harmful effects particularly with controllers having "derivative" or "rate" action. Moreover, when the controller is provided with means for developing "reset" action (typically by means of a reset capacitor, such as described in the abovementioned Olsen patent), simply making the manual signal equal to the automatic signal will not necessarily prevent a process upset at the time of switching back to automatic operation. That is, while the process is on manual operation, the reset capacitor could be charged up to a level unsuited for the subsequent automatic control of the process. Under such circumstances, after switchback the process variable could fluctuate severely for some time while the reset circuit returns to normal.

In an embodiment of the present invention to be described hereinbelow, a reset controller is provided wherein, on manual operation, the automatic control signal is maintained equal to the manual control signal. This controller also includes means for continuously holding the reset capacitor charged to the proper level for assuring "bumpless" transfer back to automatic operation. To put the system back in automatic after having been on manual, the operator need do no more than throw the transfer switch from manual to automatic, and the process controller will take over to bring the controlled condition smoothly back to set point. Other objects, aspects and advantages of the invention will be in part pointed out in, and in part apparent from, the following description of the preferred embodiment considered together with the accompanying drawing.

Referring now to the drawing, in the upper-left hand corner is shown a condition-sensing device 10 which comprises a transmitter adapted to produce an output current corresponding to the value of a process condition being measured. This transmitter may, for example, be a device of the type disclosed in U.S. Patent 2,956,212, issued to E. Olsen et al. on Oct. 11, 1960, and may include a transistor oscillator and amplifier circuit for developing a D.-C. measurement current (e.g., in the range of 10–50 milliamps) as disclosed in U.S. Patent 3,051,933, issued on Aug. 28, 1962. The output terminals of this transmitter are connected through a two-wire transmission line, consisting of leads 12 and 14, to the process controller generally indicated at 16.

This controller includes an input resistor 18 (100 ohms) arranged to produce a measurement voltage (e.g., in the range of 1 to 4 volts) corresponding to the measurement current flowing in leads 12 and 14. A set point potentiometer 20 is connected to the input resistor 18, and is energized by a D.-C. power source 22 to produce an adjustable set-point signal in series-opposition to the measurment voltage across resistor 18. The difference between these two potentials is the "deviation" signal (24) having a magnitude corresponding to the extent to which the process condition has varied from its desired value, and a polarity determined by the direction of this variation.

Near the upper right-hand corner of the drawing is shown a two-position "automatic-to-manual" transfer switch 26 for conditioning the controller for either automatic or manual operation. When this switch is in "automatic" position (as shown), the deviation signal 24 is applied, together with a negative feedback signal 28, to terminals 30 and 32 of an amplifier indicated in block outline at 34. This input circuit can be traced along lead 36 through switch contact 38 to terminal 36; and along lead 40 through switch contacts 42 and 44 to terminal 32.

As described in the above-mentioned U.S. Patent 2,956,234, amplifier 34 may be a self-oscillating transistor circuit arranged to develop at output terminals 46 and 48 a pulsating current corresponding in average magnitude to the amplifier input voltage i.e. the difference in potential between terminals 30 and 32. The gain of this amplifier is relatively high, e.g., a change in input voltage of minus 10 to plus 10 millivolts will drive the output current through its full range of 10 to 50 ma. with an output load resistance of 600 ohms.

To simplify the disclosure herein, only the final output stage 50 of the amplifier 34 has been shown. This stage is energized by a D.-C. power source 52 and its pulsating output current is filtered by capacitor 53 and fed, as the automatic control signal, through transfer switch contact 54 and a transmission line 56 to a remote valve-operating device generally indicated at 58. This latter device may be of any conventional construction and may, for example, include a servo mechanism to position a valve in correspondence with the average current fed thereto.

The pulsating output current from amplifier 34 passes through the primary winding of a feedback transformer 60, the secondary winding of which is connected to rectifiers 62 which develop across a potentiometer 64 and filter capacitor 66 a D.-C. voltage corresponding to the automatic control signal. The potential developed at the movable arm of potentiometer 64 is fed to a reset circuit comprising a series reset capacitor 68 and a shunt reset resistor 70. The potential developed across resistor 70 is the feed back voltage 28 referred to previously. Any adjustment of the potentiometer 64 will correspondingly change the amount of feedback, and thus will determine the change in valve position for a given change in the measured process condition; for that reason, potentiometer 64 is referred to as the "proportioning-band" potentiometer.

Considering now the overall operation of the controller, if the controlled process condition is stabilized at the desired set point, the deviation signal 24 will be zero, the automatic control signal fed to the valve operator 58 will normally be stabilized at some midrange current level (e.g., 30 milliamps), the voltage developed across the proportioning-band potentiometer 64 will be at a corresponding midrange potential (e.g., 15 volts), and the feedback voltage 28 developed across the resistor 70 will be zero. Assuming now that there is an increase in the output of the transmitter 10, a corresponding deviation signal 24 will be developed and fed to the input terminals 30 and 32 of the amplifier 34. Instantaneously, as the output of the amplifier 34 changes in response, the D.-C. voltage developed across potentiometer 64 will change and, since the voltage across the reset capacitor 68 cannot change immediately, a corresponding feedback signal will be developed at 28 to oppose the deviation signal 24.

The gain of the amplifier is sufficiently high that the feedback signal is substantially equal to the deviation signal. For example, with a deviation signal of 2 volts, the initial feedback signal might be 1.996 volts. Thus, the actual change in input voltage to the amplifier would be only 4 millivolts.

Subsequently, as the reset capacitor 68 charges up through the reset resistor 70 (which normally takes a long time, e.g., up to 30 minutes), the feedback signal 70 tends slowly to decrease and thereby gradually increase the output of the amplifier so as to augment the initial control action. Ultimately, of course, the process condition returns essentially to its set point, thereby reducing the magnitude of the deviation signal 24 and correspondingly reducing the input to the amplifier 34 until a new condition of balance in the process is achieved.

When the automatic-to-manual transfer switch 26 is operated to "normal" position, the D.-C. power source 52 furnishes a manual control signal to the valve-operating device 58, the current passing through an adjustable "manual set" resistor 72 and transfer switch contact 74. By changing the resistance of this resistor 72, the current flowing through the device 58 can correspondingly be altered to shift the position of the process valve. Normally, prior to switchover to manual operation, the manual control signal will be made equal to the automatic control signal, through the aid of conventional meter means, not shown. The automatic control signal, which before switchover was fed to the valve-operating device 58, now is directed by transfer switch contact 54 to a "dummy load" 76 having the same electrical characeristics as the device 58.

Connected to the positive terminal of the power source 52, and in series with the respective supply ciruits furnishing current to the valve-operating device 58 and the dummy load 76, are two small resistors 78 and 80 (e.g., 75 ohms). The upper ends of these resistors are, when the transfer switch is in manual position, connected through respective leads 82 and 84 to the input terminals 30 and 32 of the amplifier 34, the connections passing through switch contacts 38 and 44. The amplifier serves in effect to sense any difference in potential between the leads 82 and 84. If the manual control signal fed to the device 58 is equal to the automatic control signal being fed to the dummy load 76, the voltage drop across the resistors 78 and 80 will be equal, and therefore the input voltage to the amplifier 34 will be zero. If there is any difference in current through resistors 78 and 80, a corresponding voltage will be fed to the input of amplifier 34. Accordingly, the amplifier output will change correspondingly to maintain the current through the dummy load 76 at a value such that the voltage drop across resistor 78 is again essentially equal to the drop across resistor 80, i.e., the feedback action tends to produce a "null" at the amplifier input. Thus, it will be apparent that the automatic control signal fed to the dummy load 76 on manual operation will continuously "track" the manual control signal being fed to the valve-operating device 58. For that reason, the signal fed by resistors 78 and 80 to the amplifier input may be referred to as a tracking signal.

Operation of the transfer switch 26 to its manual position also causes the deviation signal 24 to be fed directly to the reset capacitor 68, the connection passing through switch contact 42. Accordingly, the potential of the left-hand plate of the reset capacitor 68 will be maintained at a value equal to the deviation signal. Changes in the output of the amplifier 34 will alter the potential of the right-hand plate of the reset capacitor and thereby change the charge on this capacitor, but will have no effect on the potential of the left-hand plate which varies only with changes in the devitation signal.

When the manual-to-automatic switch 28 is returned to its "automatic" position, the deviation signal 24 and the feedback signal 28 again will be connected together, in series opposition, to the input terminals 30 and 32 of the amplifier 34. However, since while on manual operation the deviation signal was fed directly to the reset capacitor 68, at the instant of switchback to "automatic" the feedback signal will be equal to the deviation signal, and therefore the input to the amplifier 34 will be zero. Consequently, because the amplifier input had previously been held at essentially zero voltage, after switchback to automatic there will be no significant change in the amplifier output current due to the stabilizing action of the negative feedback ciruuit.

Since there can be no immediate change in the amplifier output at switchback to automatic operation, there will be no sudden shift in the position of the valve controlled by device 58. Thereafter, if the measured process condition differs from the desired set point, the reset capacitor 68 will gradually charge up (or discharge) to tend to reduce the feedback voltage 28 to zero. This in turn will slowly alter the current through the valve-operating device 58 to bring the process condition back to the desired set point smoothly, i.e., at the "reset rate" of the controller. Thus, in accordance with the present invention, inexpensive and reliable means are provided for a assuring "bumpless" transfer from manual to automatic condition.

Although a perferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

[1. A process controller comprising amplifier means having an input circuit to receive a condition-responsive signal and adapted to produce an automatic control signal for transmission to a device for operating a process valve or the like, negative feedback means for said amplifier including energy storage means to develop reset action in said automatic control signal; an adjustable signal source for producing a manual control signal for said operating device; and switch means having "automatic" and "manual" positions, said switch means serving when in "automatic" position to connnect said automatic control signal to said operating device; said switch means serving when in "manual" position to connect said manual control signal to said operating device in place of said automatic control signal, and to connect said condition-responsive signal to said reset means to cause the output of said feedback means to be maintained energized at the level of said signal.]

[2. A process controller as in claim 1, wherein said condition-responsive signal is a D.-C. voltage representing by its magnitude the deviation between the measured process condition and a set point value thereof.]

[3. A process controller as in claim 2, wherein said reset means comprises a capacitor in said feedback circuit, said D.-C. voltage being applied directly to one side of said capacitor.]

4. A process controller comprising amplifier means having an input circuit to receive a condition-responsive signal and adapted to produce a corresponding automatic control signal for transmission to a device for operating a process valve or the like, an adjustable signal source for producing a manual control signal for manual operation of said operating device; circuit means for developing a tracking signal corresponding to the difference between said automatic control signal and said manual control signal; switch means having "automatic" and "manual" positions, said switch means being arranged when in "automatic" position to connect said automatic control signal to said operating device; said switch means being arranged when in "manual" position to connect said manual control signal to said device in place of said automatic control signal, and to connect said tracking signal to the input of said amplifier means to maintain said automatic control signal equal to said manual control signal.

5. A process controller as in claim 4, including a dummy load arranged to receive said automatic control signal when the controller is on manual operation; and voltage-dropping means connected in series with said dummy load and said operating device to develop said tracking signal in accordance with the relative magnitude of current flow therethrough.

6. A process controller comprising an amplifier having an input circuit adapted to receive a condition-responsive signal and arranged to produce a corresponding automatic control signal for transmission to a device for operating a process valve or the like, a negative feedback circuit for said amplifier and including energy storage means to develop reset action in said automatic control signal; an adjustable signal source for producing a manual control signal for said device; circuit means for developing a tracking signal corresponding to the difference between said automatic control signal and said manual control signal; switch means having "automatic" and "manual" positions, said switch means being arranged when in said "automatic" position to connect the output of said amplifier to said operating device; said switch means being arranged when in said "manual" position to (1) connect said manual control signal to said operating device, (2) connect said tracking signal to the input of said amplifier means to cause said automatic control signal to follow said manual control signal, and (3) connect the output of said negative feedback circuit directly to said condition-responsive signal, whereby when the controller is switched back to automatic the amplifier input will be held at substantially zero voltage.

7. A controller as in claim 6, including a dummy load to which the output of said amplifier is fed when on manual operation; said circuit means comprising voltage-dropping means connected in series with said dummy load and said operating device respectively to develop a tracking signal corresponding to the difference in current flow through said voltage-dropping means.

8. A controller as in claim 6, wherein said input circuit includes a signal-comparison means to develop a D.-C. deviation signal having a potential corresponding to the difference between the measured condition and a set point value thereof, said deviation signal being fed to said amplifier input together with the negative feedback signal when on automatic operation, said deviation signal being fed directly to the output end of said feedback circuit on manual operation.

9. A controller as in claim 8, wherein said feedback circuit includes a series reset capacitor and a shunt reset resistor, said deviation signal being connected directly across said reset resistor when on manual operation.

10. A controller as in claim 9, including potentiometer means connected between said reset capacitor and the output of said amplifier to adjust the proportioning band of the controller.

11. A process controller comprising amplifier means having an input circuit to receive a condition-responsive signal and *an output circuit* adapted to produce an automatic control signal for transmission to a device for operating a process valve or the like, said amplifier being provided with negative feedback means *connected between the output and input circuits and* including energy storage means to develop reset action in said automatic control signal; means for producing a [manually adjustable] *continuous* signal, *said signal-producing means including manually-controllable means for adjusting the magnitude of said continuous signal to any level within a predetermined range;* switch means having "automatic" and "manual" positions, said switch means serving when in "automatic" position to connect said automatic control signal to said operating device; said switch means serving when in "manual" position to [disconnect] *deactivate* said automatic control signal [from said operating device] and to direct to said operating device *in place thereof* a [manual] *continuous steady* control signal corresponding to said manually-adjustable signal; *first circuit means operable with said switch means in "manual" position to maintain the amplifier output signal in correspondence to said continuous signal, so that said energy storage means receives a corresponding signal from said feedback circuit; and second* circuit means connected by said switch means when in "manual" position for directing to said energy storage means *a signal* [signals] corresponding to [both] said condition-responsive signal [and said manual control signal] to maintain said storage means energized at a level proportional to the combination of said *continuous and said condition-responsive* [last-named] signals.

12. Apparatus as claimed in claim 11, wherein said switch means is operable in "manual" position to disconnect said condition-responsive signal from said input circuit, said switch means serving when in "manual" position to connect to said input circuit a signal derived from said manually-adjustable signal to produce at the output of said amplifier means a signal corresponding to said manually-adjustable signal, whereby said energy storage means receives a signal corresponding to said manual control signal through said negative feedback means.

13. Apparatus as claimed in claim 11, wherein said circuit means maintains said storage means energized at a level proportional to the difference between said last-named signals.

14. Apparatus as claimed in claim 11, wherein said condition-responsive signal is proportional to the difference between the value of the measured process condition and a desired value thereof.

*15. In process control apparatus of the type having an amplifier the input of which is adapted to receive a deviation signal together with a feedback signal having a magnitude related to the positioning of a process valve or the like being controlled, said amplifier producing an output signal normally serving to set the valve position automatically such that changes in the deviation signal tend to produce corresponding changes in the valve position, the apparatus including automatic-to-manual switch means which when placed in "manual" position isolates the amplifier input from the influence of said deviation and feedback signals and directs these two signals to storage means to store therein a composite signal level reflecting a combination of both signals for subsequent use in preventing any sudden upset in the controller output upon switchback to "automatic" operation, the apparatus further including an adjustable manual signal source for establishing the value of a control signal for the valve when said switch is in "manual" position;*

*an improvement in such apparatus of the type wherein said feedback signal is developed directly from the output circuit of said amplifier;*

*the improvement including circuit means made effective by said switch means when in "manual" position to connect to the input of said amplifier a voltage derived from said manual signal source and responsive to changes in the adjustment thereof; and a negative feedback circuit activated by said switch means when in "manual" position to couple a signal from the amplifier output circuit to the amplifier input circuit in opposition to said voltage derived from the manual signal source and arranged to maintain said amplifier output continuously in correspondence with the set level of said manual signal source, whereby when the system is operating in "manual" mode the feedback signal directed to said storage means from the amplifier output corresponds at all times to the manually set control signal directed to the process valve.*

*16. In process control apparatus of the type comprising an amplifier having two input terminals and arranged to produce an output signal proportional to the difference in potential between said input terminals, with means normally operative to apply to said input terminals a deviation signal together with a feedback signal having a magnitude related to the positioning of a process valve or the like being controlled, the amplifier output normally serving to set the valve position automatically such that changes in the deviation signal tend to produce corresponding changes in the valve position, the apparatus including automatic-to-manual switch means which when placed in "manual" position isolates the amplifier input from the influence of said deviation and feedback signals and directs these two signals to storage means to store therein a composite signal level reflecting a combination of both signals for subsequent use in preventing any sudden upset in the controller output upon switchback to "automatic" operation, the apparatus further including an adjustable manual signal source for establishing the value of a control signal for the valve when said switch is in "manual" position;*

*an improvement in such apparatus of the type wherein said feedback signal is developed directly from the output circuit of the amplifier;*

*the improvement including circuit means made effective by said switch means when in "manual" position to connect to one input terminal of said amplifier a potential derived from said manual signal source and responsive to changes in the setting thereof; and a negative feedback circuit activated by said switch means when in "manual" position to couple to the other amplifier input terminal a potential derived from the amplifier output circuit and tending by negative feedback action to equal said potential derived from the manual signal source, said negative feedback circuit serving to maintain said amplifier output continuously in correspondence with the set level of said manual signal source, whereby when the system is operating in "manual" mode the feedback signal directed to said storage means from the amplifier output corresponds at all times to the manually set control signal directed to the process valve.*

*17. In process control apparatus of the type having an amplifier the input of which is adapted to receive a deviation signal together with a feedback signal having a magnitude related to the positioning of a process valve or the like being controlled, the feedback signal being transmitted through a circuit including a reset capacitor to produce reset action, said amplifier producing an output signal normally serving to set the valve position automatically such that changes in the deviation signal tend to produce corresponding changes in the valve position, the apparatus including automatic-to-manual switch means which when placed in "manual" position isolates the amplifier input from the influence of said deviation and feedback signals and directs these two signals to said reset capacitor to store therein a composite signal level reflecting a combination of both signals for subsequent use in preventing any sudden upset in the controller output upon switchback to "automatic" operation, the apparatus further including an adjustable manual signal source for establishing the value of a control signal for the valve when said signal is in "manual" position;*

*an improvement in such apparatus of the type wherein said feedback signal is developed directly from the output circuit of said amplifier;*

*the improvement comprising circuit means made effective by said switch means when in "manual" position to connect to the input of said amplifier a voltage derived from said manual signal source and responsive to changes in the adjustment thereof; and a tracking feedback circuit activated by said switch*

*means when in "manual" position to couple a signal from the amplifier output circuit to the amplifier input circuit in opposition to said voltage derived from the manual signal source, said tracking feedback circuit being arranged to maintain said amplifier output in correspondence with the set level of said manual signal source, whereby when the system is operating in "manual" mode the feedback signal directed to said reset capacitor from the amplifier output corresponds at all times to the manually set control signal directed to the process valve.*

References Cited

The following references, cited by the Examiner, are of record in the patented file of this patent or the original patent.

UNITED STATES PATENTS 2,697,022 5/1954 McIlhenny ---------- 318—28

NATHAN KAUFMAN, *Primary Examiner.*

U.S. Cl. X.R.

330—51